(12) United States Patent
Mitchell

(10) Patent No.: US 11,867,552 B2
(45) Date of Patent: Jan. 9, 2024

(54) ANIMAL WEIGHING SYSTEM

(71) Applicant: PLATINUM AGRIBUSINESS PTY LTD, Aberfoyle (AU)

(72) Inventor: William Mitchell, Aberfoyle (AU)

(73) Assignee: PLATINUM AGRIBUSINESS PTY LTD, Aberfoyle (AU)

( * ) Notice: Subject to any disclaimer, the term of this patent is extended or adjusted under 35 U.S.C. 154(b) by 865 days.

(21) Appl. No.: 16/496,983

(22) PCT Filed: Mar. 26, 2018

(86) PCT No.: PCT/AU2018/000045
§ 371 (c)(1),
(2) Date: Sep. 24, 2019

(87) PCT Pub. No.: WO2018/170535
PCT Pub. Date: Sep. 27, 2018

(65) Prior Publication Data
US 2020/0319014 A1 Oct. 8, 2020

(30) Foreign Application Priority Data
Mar. 24, 2017 (AU) .............................. 2017901066

(51) Int. Cl.
*G01G 17/08* (2006.01)
*A01K 29/00* (2006.01)
*G01G 19/52* (2006.01)

(52) U.S. Cl.
CPC .............. *G01G 17/08* (2013.01); *A01K 29/00* (2013.01); *G01G 19/52* (2013.01)

(58) Field of Classification Search
CPC ........ G01G 17/08; G01G 19/52; A01K 29/00; A01K 5/0107; A01K 5/015; A01K 11/006
See application file for complete search history.

(56) References Cited

U.S. PATENT DOCUMENTS 4,617,876 A * 10/1986 Hayes .................. A01K 11/006
119/908
6,868,804 B1  3/2005 Huisma et al.
(Continued)

FOREIGN PATENT DOCUMENTS

EP  3093630 A1  11/2016

OTHER PUBLICATIONS

International Search Report and Written Opinion issued in Application No. PCT/AU2018/000045 dated Jun. 29, 2018, 11 pages.

*Primary Examiner* — Seung H Lee
(74) *Attorney, Agent, or Firm* — DITTHAVONG, STEINER & MLOTKOWSKI

(57) ABSTRACT

A portable weighing unit (10) comprising a body having a pair of side walls (12, 14) and an end wall (13) defining a space for receiving an animal. A holder (17) mounted with respect to the body and configured to receive an enticement (18) for attracting an animal into the space. A reader (19) mounted with respect to the body and configured to read animal identification (ID) information provided on an ID tag of the animal. A platform (15) located within said space to receive the front feet of the animal and take a weight measurement of the front feet. A controller (20) for receiving the said weight measurement from the platform and the animal ID information from the reader and transmit them to a remote processor for processing wherein the processor is configured to convert the weight measurement of the front feet to a full body weight measurement for the animal.

17 Claims, 6 Drawing Sheets

(56) References Cited

U.S. PATENT DOCUMENTS

| | | | |
|---|---|---|---|
| 7,026,939 B2* | 4/2006 | Letkomiller | A01K 11/006 |
| | | | 340/573.3 |
| 8,588,476 B1 | 11/2013 | Spicola, Jr. | |
| 9,974,284 B2* | 5/2018 | Harty | A61B 5/0022 |
| 2007/0137584 A1* | 6/2007 | Travis | A01K 5/02 |
| | | | 119/51.02 |
| 2009/0178859 A1 | 7/2009 | Kleinsasser | |
| 2019/0075756 A1* | 3/2019 | Albornoz | A01K 11/006 |

* cited by examiner

ANIMAL WEIGHING SYSTEM

CROSS REFERENCE TO RELATED APPLICATION

This application is a 35 U.S.C. § 371 National Stage of International Application No. PCT/AU2018/000045, filed Mar. 26, 2018, which claims priority to the Australian Patent Application No. 2017901066 filed Mar. 24, 2017, the disclosures of which are incorporated in their entirety.

FIELD OF INVENTION

The present invention relates generally to an animal weighing system, and in particular, to an animal weighing system that is portable and able to collect and gather weight information about individual animals in an automated manner.

BACKGROUND OF THE INVENTION

For primary producers, especially graziers, the ability to closely monitor the weight of livestock and their rate of weight gain is fundamental in establishing efficient farming practices. Such knowledge of animal weight provides a farmer with the ability to more effectively understand the grazing conditions of the animals and to plan when livestock are in prime condition suitable for sale, thus ensuring maximum return on the animal at market. Access to weight information also enables a farmer the ability to plan for future sales based on animal weight gains and to make selections of animals at such future sales according to their suitability to the grazing conditions and the animal's ability to gain weight in such conditions.

With a greater understanding of controlled breeding programs, the ability to determine those animals that show the best weight gain responses to certain crop conditions enables farmers the ability to selectively breed animals that are best suited to the grazing conditions they are to encounter. Further to this, the farmer can assess individual animal's health needs and take action where appropriate to address animal weight loss.

Also, by having the ability to monitor animal weight gain, the farmer is able to gain a greater appreciation of the effectiveness of the available feed in contributing to weight gain and make decisions to supplement such feeding regimes if considered necessary. The farmer can then plan cropping cycles to improve feed quality and efficiency if required.

Whilst the benefits of having regular access to animal weighing systems can be appreciated, for many farmers there is limited access to such systems.

Conventionally, in order to access a system that provides such weight data, the farmer must collect the animals in yards which is both time consuming and labour intensive and can lead to animal weight loss due to stress associated with gathering and moving the animals to the yards. Once in the yards, the animals are typically isolated from other animals for individual weighing on a weigh-bridge or the like. This may be achieved through the use of a crush system for capturing the individual animals for weighing, or by causing the animals to pass over a weighbridge. This generally requires the animals to be immobilised in some way such that their full weight is able to be borne by the weighbridge to capture their true body weight.

Depending upon the system employed, the weight measurement taken may be recorded against an individual animal identifiable through the animal's ear tag; however, in more basic systems, only the weight of the animal is recorded. It will be appreciated that there are significant costs associated with such a system due to installation of a dedicated yards and the ability to employ dedicated scales for weighing the animals. Whilst new walk-over weighing systems have been proposed to provide a more automated system for weighing the animals, such systems are costly and require significant infrastructure to install and require animals to be trained to use the system.

For this reason, animal weight assessment in a grazing situation has traditionally been performed through a visual assessment by the farmer. Such a system is highly reliant on the skill and experience of the farmer in assessing animal weight and the farmer's knowledge of the animals, and is prone to error and inaccuracies. In-field weight measurement systems are difficult to employ as they require isolation of the animals and measurement of the full body weight of each animal. As livestock generally move in herds, it is difficult to isolate the animals in a manner whereby their weight can be individually measured without another animal affecting the weight.

Thus, there is a need to provide a mobile system for weighing individual animals that can be automated and located in the field for use when the animals are grazing, without requiring significant expense in terms of time, labour and other infrastructure.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a portable weighing unit for weighing animals in a grazing environment comprising:
 a body having a pair of side walls and an end wall that define a space for receiving an animal therein;
 a holder mounted with respect to the body, the holder configured to receive an enticement for attracting an animal into the space;
 a reader mounted with respect to the body, the reader being configured to read animal identification information provided on an identity tag of the animal within the space;
 a platform located within said space so as to receive the front feet of the animal thereon when said animal enters said space and to take a weight measurement of the front feet of the animal; and
 a controller for receiving the weight measurement of the front feet from the platform and the animal identification information from the reader, said controller being configured to transmit said weight measurement and said animal identification information to a remote processor for processing;

wherein the remote processor is configured to convert the weight measurement of the front feet of the animal into a full body weight measurement for the animal.

The body may be configured to be transportable by a vehicle to a grazing environment for use. In one form, the body may have wheels to facilitate towing to said grazing environment for use. In another form, the body is configured to be engaged by a lifting device of a vehicle to be carried by the vehicle to the grazing environment for use.

The pair of side walls may comprise substantially open frame structures that extend substantially orthogonally from opposing ends of the end wall.

The holder may be mounted to an internal surface of the end wall. The holder may comprise a box for receiving and displaying the enticement to the animal. The enticement may be a food or nutrient for consumption by the animal. The enticement may be a lick block for attracting the animal into the space and for maintaining the animal within the space for a period of time.

The reader may be mounted within the space to read the animal identification information from the identity tag of the animal. The reader may be mounted on a side wall of the body to read the identity tag placed in an ear of the animal when the animal is within the space. The reader may be mounted within a box that is mounted within the space. The reader may be an RFID reader for reading an RFID tag of the animal.

The platform may be fitted to substantially cover said space so as to receive the front feet of the animal present in the space. The platform may be configured to be supported by at least two load bars to capture the front feet weight of the animal present thereon. The platform may be raised above a ground surface to facilitate stepping of the animal onto the platform.

The controller may comprise at least a microprocessor for receiving and storing the information from the reader and the platform and a transmitter for transmitting data to the remote processor. The transmitter may be a wireless transmitter for transmitting data wirelessly to the remote processor. The transmitter may include a USB connection for wired transmission of said data to the remote processor.

In accordance with another embodiment of the present invention, there is provided a method of obtaining weight recordings of animals in a grazing environment comprising:
  positioning a portable weighing unit in said grazing environment to entice animals to enter the weighing unit as they graze;
  measuring the front foot weight of the grazing animals as they enter the portable weighing unit;
  collecting the measured front foot weight for each animal over a predetermined grazing period as animal weight data;
  converting the front feet weight data to full body weight data for each animal; and
  generating reports on the weight of the grazing animals.

The step of positioning the weighing unit comprises positioning a weighing unit in accordance with the weighing unit of claims 1-19 in a field accessible to the grazing animals.

The step of measuring the front foot weight of the grazing animals as they enter the portable weighing unit comprises positioning a weighbridge in an opening of the portable weighing unit such that the front feet weight of the animal is automatically taken when the animal enters the unit. The step of measuring the front foot weight of the grazing animals as they enter the portable weighing unit may further comprise enticing the animals into the portable weighing unit by placing an enticement therein. The step of enticing the animal may comprise placing a salt block in the unit to entice the animals to enter.

The step of collecting the measured front foot weight for each animal over a predetermined grazing period may comprise transmitting the animal weight data to a remote processing centre. Alternatively, the step of collecting the measured front foot weight for each animal over a predetermined grazing period may comprise downloading the animal weight data to a hand held device carried by a farmer.

The step of converting the front feet weight data to full body weight data may comprises multiplying each front feet weight measurement by a conversion factor to obtain the full body weight measurement.

In one form, the conversion factor is empirically derived based on collected field trials. In another form, the conversion factor is obtained by a regression equation that includes adjustments according to animal breed, animal sex, and/or animal weight class. In yet another form, the conversion factor is obtained from a look up table managed by the remote processing center based on the animal breed, animal sex, and/or animal weight class. In yet another form, the conversion factor is around approximately 1.75.

According to another aspect of the invention, there is provided a portable weighing unit for animals comprising:
  a body having an open top and an open end for receiving an animal therein;
  an enticement element mounted within the body to entice an animal into the open end of the body;
  a weighing platform for receiving at least the front legs of the animal thereon for determining the weight of the animal as the animal is attending to the enticement element;
  a reader mounted within the body adjacent the enticement element for reading an identity tag of the animal as the animal is attending to the enticement element; and
  a controller for receiving and storing weight data and animal identification data and for transmission to a user;
  wherein the body is configured to be transportable for use with animals in their natural grazing environment.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The system and apparatus of the present invention will be described below in relation to its application for use in field based environment with grazing animals, namely cattle. However, it will be appreciated by those skilled in the art that the system and apparatus of the present invention could be equally employed in a variety of different environments, such as containment yards and the like, as well as for different animals such as sheep, goats, pigs, deer and the like.

Figure 1:
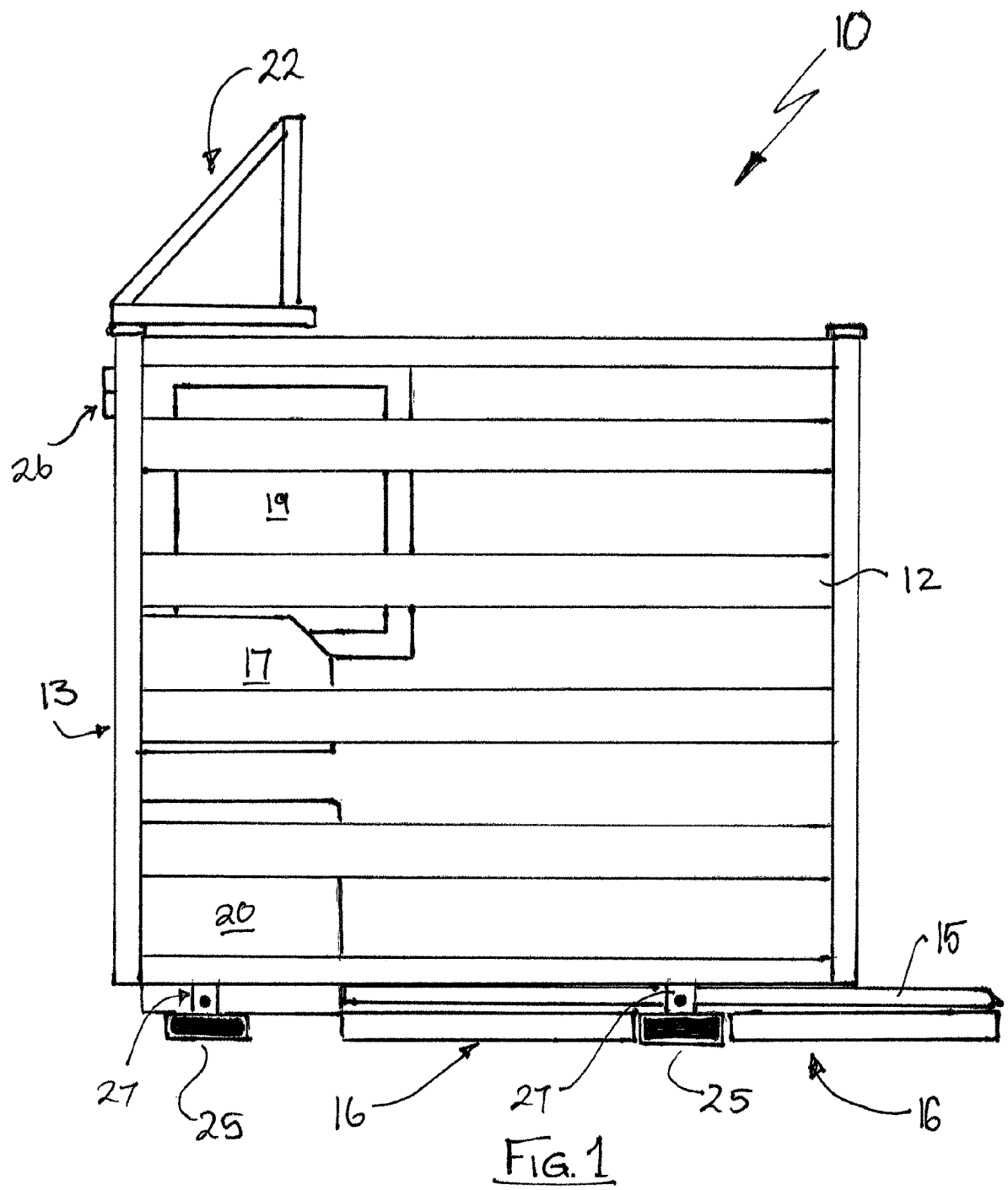
FIG. 1 is a side view of a weighing unit in accordance with an embodiment of the present invention.
Figure 2:
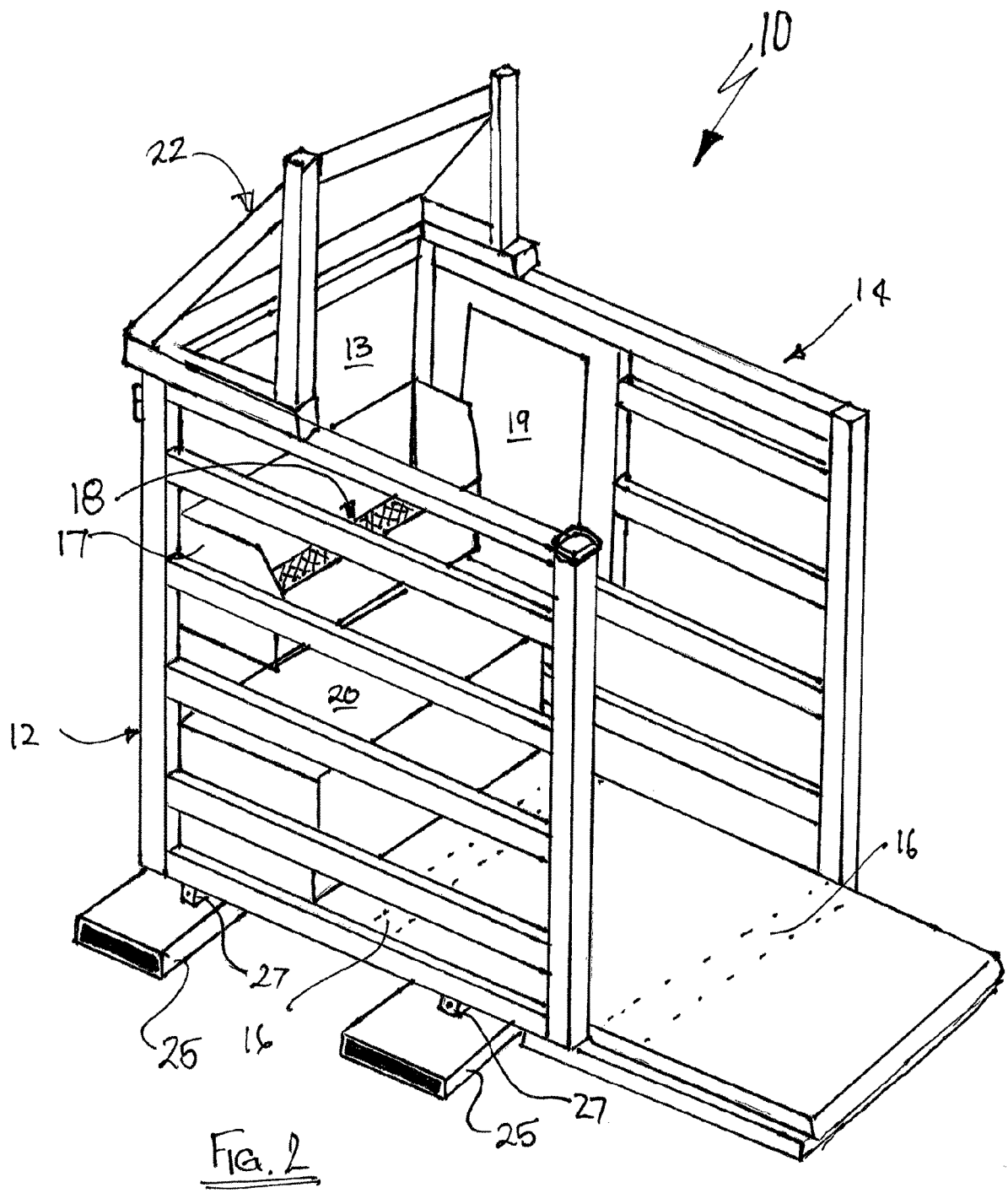
FIG. 2 is a rear perspective view of the weighing unit of FIG. 1.

Referring to FIG. 1, a weighing unit 10 is depicted in accordance with an embodiment of the present invention. The unit 10 may be configured as a robust unit that can be transported to a site for use, or configured such that it can be assembled on site with minimum effort. In this regard, the unit 10 generally comprises a pair of side walls 12, 14 and an end wall 13. Each of the side walls 12, 14 are a substantially open frame structure and have a length and height sufficient to accommodate a single animal, such as a cow or the like, there between when erected. As the end wall 13 determines the spacing of the side walls 12, 14, the end wall 13 has sufficient width to enable the animal to enter and exit the unit 10 as desired. It will be appreciated that whilst the unit 10 is depicted as having a fixed width, the end wall 13 may engage with the side walls 12, 14 in a variable manner to vary the width of the unit 10 to accommodate different sized animals.

In one form, each of the end wall 13 and side walls 12, 14 are configured to be simply assembled/disassembled for transport and as such, may contain simple screws and the like for easy assembly.

In another form, the unit 10 may be assembled to have a more robust construction and will have a size sufficient to be loaded on a tray of a conventional utility vehicle or flat-bed truck for transport when assembled, as required. In this regard, the feet 25 of the unit 10 are of an open structure such that they can receive the ends of a forklift or similar handling device for transport to site. Alternatively, wheels may be mounted on the base of the unit 10 such that the unit can be simply towed behind a vehicle for transport to an appropriate site.

In one embodiment, the end wall 13 may be attached to each of the side walls 12, 14 at an upper end thereof by way of a mating joint 26 into which a pin is received. The base of each of the side walls 12, 14 has a pair of stubs 27 projecting therefrom which are configured to be received within sleeves formed in an upper surface of the feet 25. In this regard, the stubs 27 can be simply dropped into the sleeves of the feet 25 and a pin or screw may be used to engage the stubs in place. In such an arrangement the feet 25 aid to secure and retain the unit 10 together. This enables the unit 10 to be assembled together to define a substantially open end that defines the entry/exit of the unit 10. Whilst not shown, the entry/exit of the unit 10 may be variable in width to narrow the point of entry to accommodate different sized animals. The roof of the unit 10 is also substantially open to accommodate the animal therein in a safe and non-threatening manner so as to promote animal entry and exit.

The base of the unit 10 comprises a pair of feet 25 that extend laterally across the length of the unit. A platform 15 is fitted into the open end of the unit to be supported over two load bars 16. Each of the load bars 16 are spaced apart to support the base in a substantially stable manner. The load bars 16 are conventional load bars used for creating scales in most conventional agricultural weighing systems. The load bars 16 are mounted onto the base of the unit 10 with the platform 15 mounted and secured thereon. The load bars 16 contain load cells for determining the weight of the animal standing thereon. Once positioned the platform extends across the base of the unit 10 and is slightly raised above the ground surface such that the animal entering the unit 10 is caused to step onto the platform 15.

A retaining box 17 is mounted to an inside surface of the end wall 13 for receiving and presenting an enticement element 18 to the animal, to entice the animal to enter the unit 10. The enticement element may take a variety of forms and is usually a form of food or nutrient, such as a lick block. When the lick block 18 is located in the retaining box 17, it is presented at a desired height for licking by the animal as a means for enticing the animal into the unit for weighing. It will be appreciated that whilst a lick block 18 is depicted as being the enticement element, other elements can also be used for this purpose, such as feed supplements, in order to lure the animals into the unit 10.

A reader box 19 is mounted in the inside portion of one of the side walls 12, 14 adjacent the end wall 13. This reader box 19 has dimensions of 600 mm×600 mm and has a depth of 200 mm and houses the electronics associated with an ear tag reader to identify the animal present in the unit 10 as it is being weighed. In this regard, the reader box 19 is located along the side wall of the unit 10 adjacent the lick block 18 to have ready access to the ear tag worn by the animal. The reader may include an RFID reader for reading an RFID tag carried by the animal, typically attached to the animal's ear. In this regard, the reader box 19 is able to emit an RF signal that enables the RFID tag carried by the animal to transmit a response signal to be accurately read to automatically identify the animal being weighed as it enters the unit to lick the block 18. It will be appreciated that the reader may take any number of a variety of forms and may be passive, active or battery-assisted passive for reading other ID tags carried by the animal, such as embedded chips and the like, whilst the animal is attending to the enticement element and being inadvertently weighed. The reader box 19 may also house other elements of the system, such as a computer controller for controlling the system and a transmitter for transmitting data from the system to a remote server, or external device by way of a USB connection.

In order to collect and store the information relating to the animal, a computer controller is provided within the unit as discussed above. The controller comprises a basic microprocessor for receiving, storing and transmitting data collected, such as animal ID and recorded weight and may also include a rechargeable power source, such as a battery, for supplying power to operate the system. The battery and controller may be stored within the weatherproof box 20 located below the retaining box 17, although other locations of the controller 20 are also envisaged, including within the reader box 19 as discussed above.

The open top region of the unit 10 may optionally comprises a guard member extending around a periphery thereof. The guard member may provide a degree of protection to the lick block 18 from direct rain and sunshine and may prevent other animals reaching over the top of the unit 10 and inadvertently setting off the reader 19.

As is shown, a solar panel 22 is mounted to the front of the unit 10 to provide power to recharge the power source of the controller. However, it will be appreciated that a plurality of solar panels may be provided and mounted to the unit 10 at multiple locations, to provide appropriate power to operate the system.

In a preferred form, the controller may comprise a transmitter/receiver unit for transmitting the data collected from the animals to a remote server where it may be downloaded and viewed by the farmer without the farmer having to physically visit the unit 10 to download the data. The transmitter/receiver unit may be configured to communicate with a local telecommunication network or via a satellite network to facilitate transfer of data onto a cloud based server or the like. In this regard, the controller may also be configured to transmit a regular status signal to a remote monitoring network to provide the farmer with regular updates on the status of the unit so that should an element of the unit 10 fail, the farmer will be immediately advised of the failure to take action to rectify such a failure. In an alternative embodiment, the computer controller of the unit 10 may be accessed directly by a farmer to download the collected data therefrom. In this regard, the controller may include a USB port connection, such that the farmer can simply insert a basic USB stick and download updated data from the device which can be processed by the farmer on the farmer's own office or home computer at the end of a day. Similarly the farmer may have a smart phone having a software application that is capable of wireless interaction with the computer controller of the unit 10, such as by a Bluetooth® connection or the like, to download data as it becomes available.

As previously discussed, the structure of the unit 10, namely the side walls 12, 14 and end wall 13, are configured to be sturdy to avoid any animals overturning or damaging the unit when in use. Due to the structure of the unit 10, only one animal can enter the unit 10 at a time, ensuring that only one weight measurement can be taken at a time, thereby minimising the potential for another animal to stand on the platform as well, which may provide an incorrect reading. In this regard, the controller may be configured to only record readings within predetermined weight limits to avoid any false readings being taken and recorded. Similarly the controller may be configured to constantly recalibrate itself to account for any deposits building up on the platform 15, such as faecal matter, which may generate false weight readings. This can be simply done by routinely taking a weight measurement when the unit is not occupied or by having the controller reset to zero after a weight has been recorded and that weight is removed from the platform. Due to the configuration and position of the reader 19, the unit 10 will only read the ID tag of the animal that is within the unit 10 and not in the general vicinity of the unit 10.

In use, the unit 10 is to be positioned within a paddock or field where the animals are grazing The animals will identify the presence of an enticement element 18 and, over time, will freely enter the unit 10 and treat themselves to the enticement element. As they perform this task their weight will be measured and recorded against their ID, for use by the farmer as part of their ongoing farm management program.

The weighing system of the present invention differs from conventional systems in that it does not require each animal to position their entire body weight on the weighing platform, which is difficult to perform naturally without a crush or the like to restrain the animals. Rather, the present invention utilises only the front feet weight measurement and employs extrapolation software to determine the full body weight of the animal As part of this process, erroneous measurements are also able to be avoided, as may occur when the animal manages to only place one foot on the platform or is pushed by another animal. Due to the fact that only front feet weight measurements are taken by the unit 10, the unit 10 is able to be simply constructed for transportability by the farmer in accordance with the farmer's needs.

It will be appreciated that the weighing system of the present invention provides a simple and convenient means by which weight measurements of livestock in a grazing environment can be taken in an automated manner. This minimises disruption to the animals and reduces the work and time required by the farmer to obtain such data. The farmer can simply collect the data as he goes about his regular tasks inspecting the herds and use the data for a variety of different purposes, such as to make projections about the average and range of weights of the livestock and the best times to take the livestock to market to maximise returns.

Figure 3:
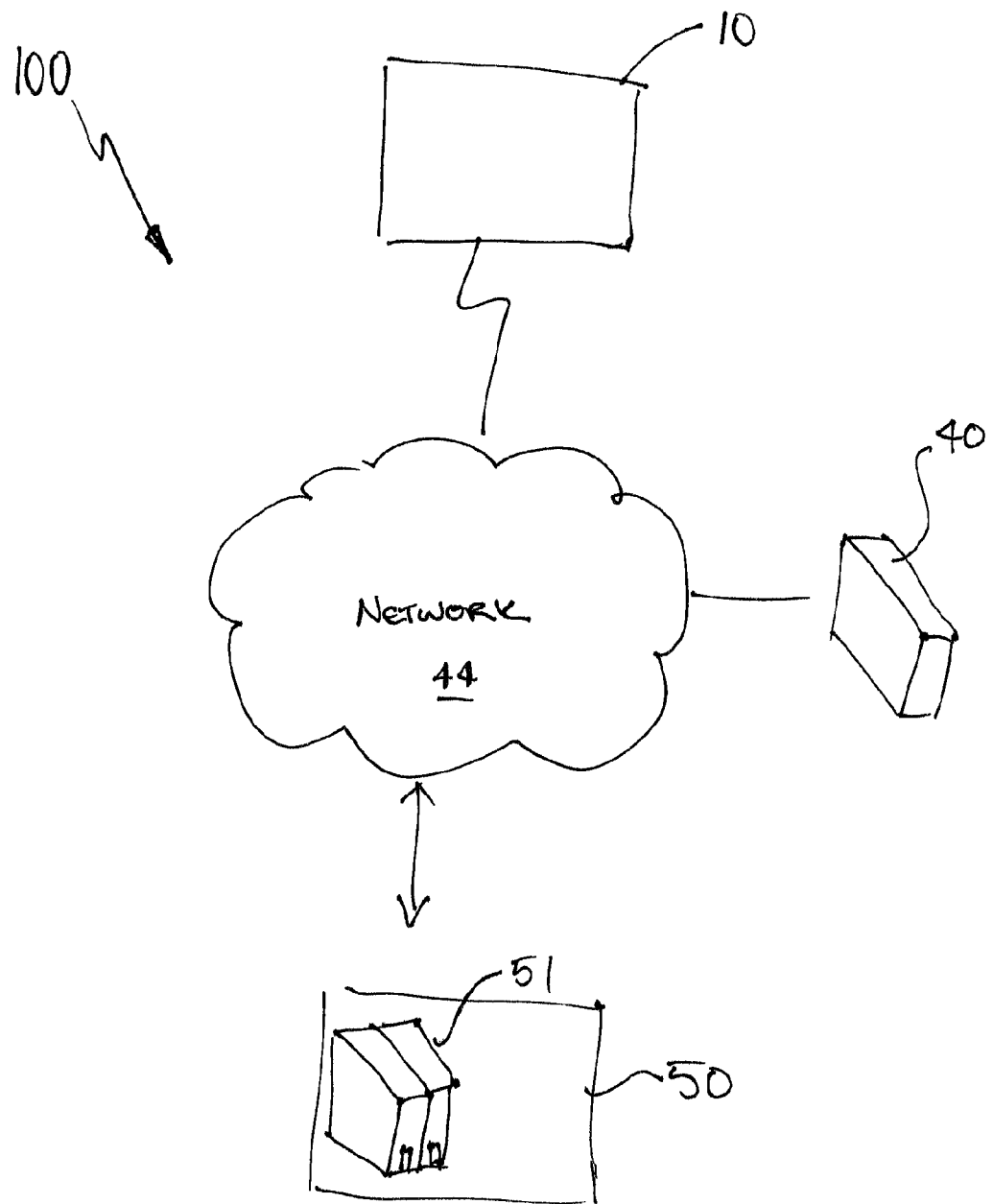
FIG. 3 is a system diagram depicting a weight management system according to an embodiment of the invention.

Referring to FIG. 3, an embodiment of a system 100 in accordance with the present invention is depicted. The system 100 will be referred to as a livestock weight management system.

The livestock weight management system 100 generally includes a network 44 that facilitates communication between a unit 10, the farmer 40 and a host service 50. In the embodiment of the system 100 as depicted, only a single unit 10 and farmer 40 combination is depicted as communicating with the host service 50. However, it will be appreciated that multiple farmer/unit combinations may communicate with the host service 50 to store and process data collected from the units 10.

The host service 50 is depicted as comprising one or more host servers 51 that communicate with the network 44 via wired or wireless communication, as will be appreciated by those skilled in the art. The one or more host servers 51 are configured to store a variety of information collected from the units 10 and farmers 40. The host servers 51 are also able to house multiple databases necessary for the operation of the methods and systems of the present invention. The servers 51 may comprise any of a number of servers known to those skilled in the art and are intended to be operably connected to the network 44 so as to operably link to a computer system associated with the farmer 40, as depicted. The servers 51 typically include a central processing unit or CPU that includes one or more microprocessors and memory operably connected to the CPU. The memory can include any combination of random access memory (RAM), a storage medium such as a magnetic hard disk drive(s) and the like.

In a preferred embodiment, the distributed computing network 44 is the internet or a dedicated mobile or cellular network in combination with the internet, such as a GSM, CDMA or WCDMA network. Other types of networks such as an intranet, an extranet, a virtual private network (VPN) and non-TCP/IP based networks are also envisaged.

The farmer 40 device may comprise a personal computer, laptop computer or smart phone capable of storing and processing data as well as transmitting data over the network 44. The farmer 40 device may receive weight measurement data directly from the unit 10 at regular intervals via a wireless connection or may receive data each time the farmer downloads data from the unit 10 in the field via a USB or Bluetooth® connection. The farmer device 40 may be loaded with software that enables processing of raw data received directly from the weighing unit 10 into reports and other useful information based on the measured data. Alternatively, the farmer device 40 may communicate with the host server 50 to convert the raw data received from the weighing unit 10 into useful data that can be understood and processed by the farmer device 40. In this alternative arrangement, the host server 50 may receive ongoing data updates from the weighing unit 10 located in the field via the network 44 which are processed and stored by the host servers 51 to be accessed by the farmer via the farmer device 40. The type of system 100 employed may vary and offer different services depending upon subscription fees and ongoing software maintenance requirements and the storage and control requirements of the farmer.

In essence, the weigh unit 10 will collect raw data associated with each weighing event. A weighing event may include an animal ID code that may be associated with the animal's ear tag, and a front feet weight measurement. Other data such as the time and date of the weighing event may also be recorded. This data is then stored in sequential manner within the controller 20 of the unit 10. At regular predetermined intervals this weighing event data will be transmitted to the host service 50 or the farmer device 40, depending upon connection with the network 44.

The host service 50 will receive the raw data and will process the raw data into usable data for review by the farmer via the device 40. This will involve processing the front feet weight measurement into a full body weight measurement based upon an empirically defined conversion algorithm. This data can then be tabulated for each of the farmer's herds using the weigh unit 10, where the historical weight measurements of each animal can be provided in a tabular form for further processing by the farmer 40 device. This tabulated data is transmitted to the farmer device 40 via the network and the host service 50 will then store a history of the measurements against the farmer's profile.

The software of the farmer device 40 will be able to generate reports for the farmer based on the processed data received from the host service 51. These reports may include current herd weights, herd weight gain, individual animal gains and various comparisons against historical data maintained by the host service 51 or the farmer. The farmer is then able to save this data and review the data to assist with ongoing herd management.

Figure 4:
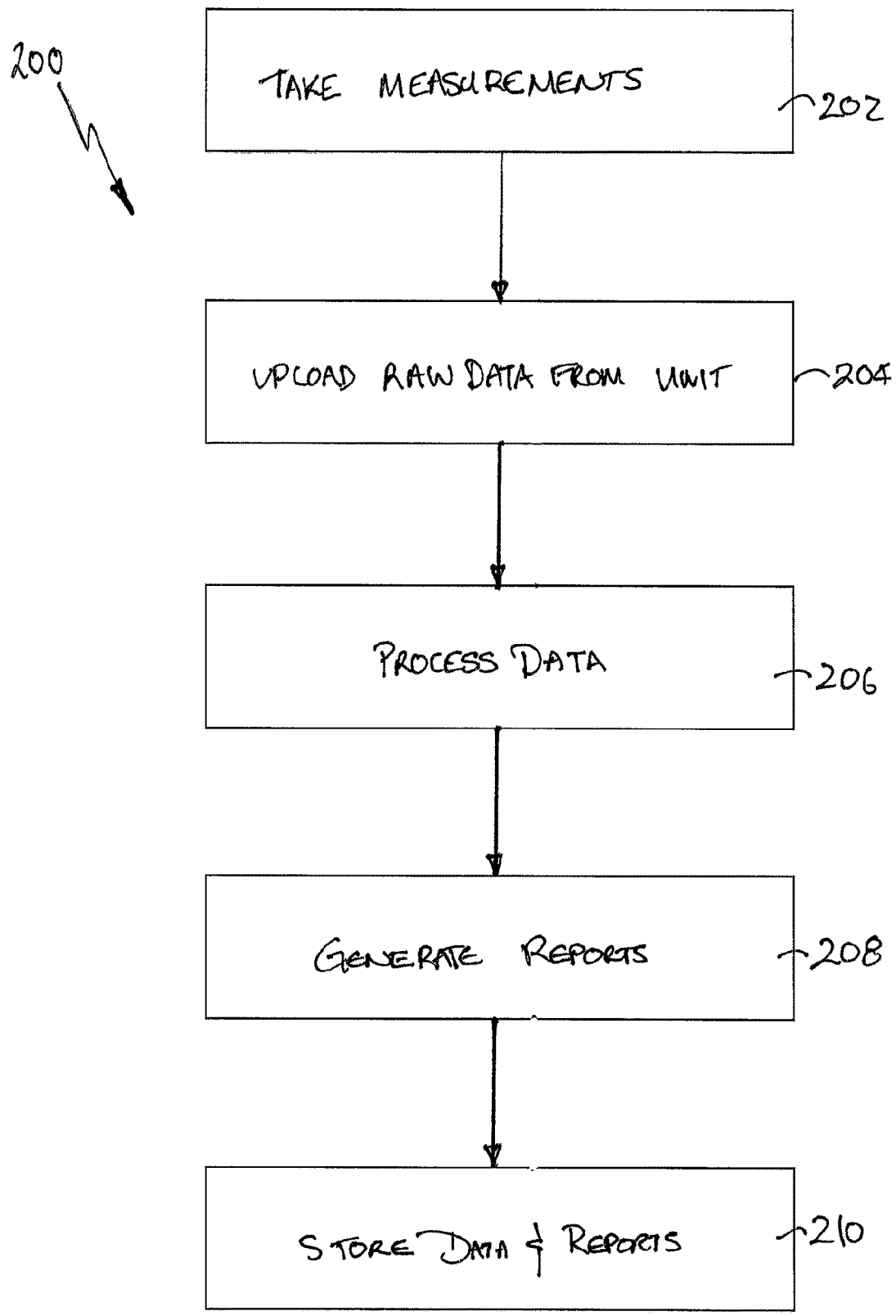
FIG. 4 is a flow diagram depicting a method of measuring and processing weight information in accordance with an embodiment of the present invention.

An embodiment depicting a method 200 of managing livestock weight using the system 100 of the present invention is depicted in FIG. 4.

The method 200 comprises a first step 202 wherein the weighing unit 10 is positioned in a grazing environment for access by a herd of livestock that the farmer wishes to monitor. Each animal in the herd is identifiable by way of an ear-tag and the unit 10 is equipped with a salt block or similar enticement means to entice the animals to enter the unit 10 at which time a weight measurement for that animal will be taken and recorded by the computer controller of the unit 10. The unit 10 may be accessible to the animals for any specified time period as required by the farmer.

In step 204, the raw measurement data taken from the animals is uploaded from the unit 10. This raw data includes a front feet weight measurement and the identification code for each measurement event conducted by the unit 10. The unit 10 may upload this data directly to the remote host service or the farmer device for processing at predetermined intervals over a network. Alternatively, the farmer may collect the data directly from the unit by way of a USB or Bluetooth connection, upon visiting the unit as part of a regular herd inspection carried out by the farmer.

In step 206, the raw data uploaded from the weighing unit 10 is processed to remove false measurements, such as when only one foot has been present on the weighbridge or where another animal has effected the measurement reading. The front foot measurements are then converted to full body weight measurements for each animal. This can be done by the host service 50 and the data can be stored remotely by the host service 50 for access by the farmer. Alternatively, the farmer device 40 may be configured with software to process the raw data directly for storage on the farmer device.

In step 208, reports are generated based on the processed raw data. The reports may be generated by the host service 50 or may be generated by the software stored on the farmer device 40. The reports may show weight distribution for the herd and average mob weight and may also utilise historical data to show percentage weight increase as well as real weight increase over time.

In step 210, the reports generated and the associated data are stored by the host service 50 or by the farmer device 40 for future reference.

Figure 5:
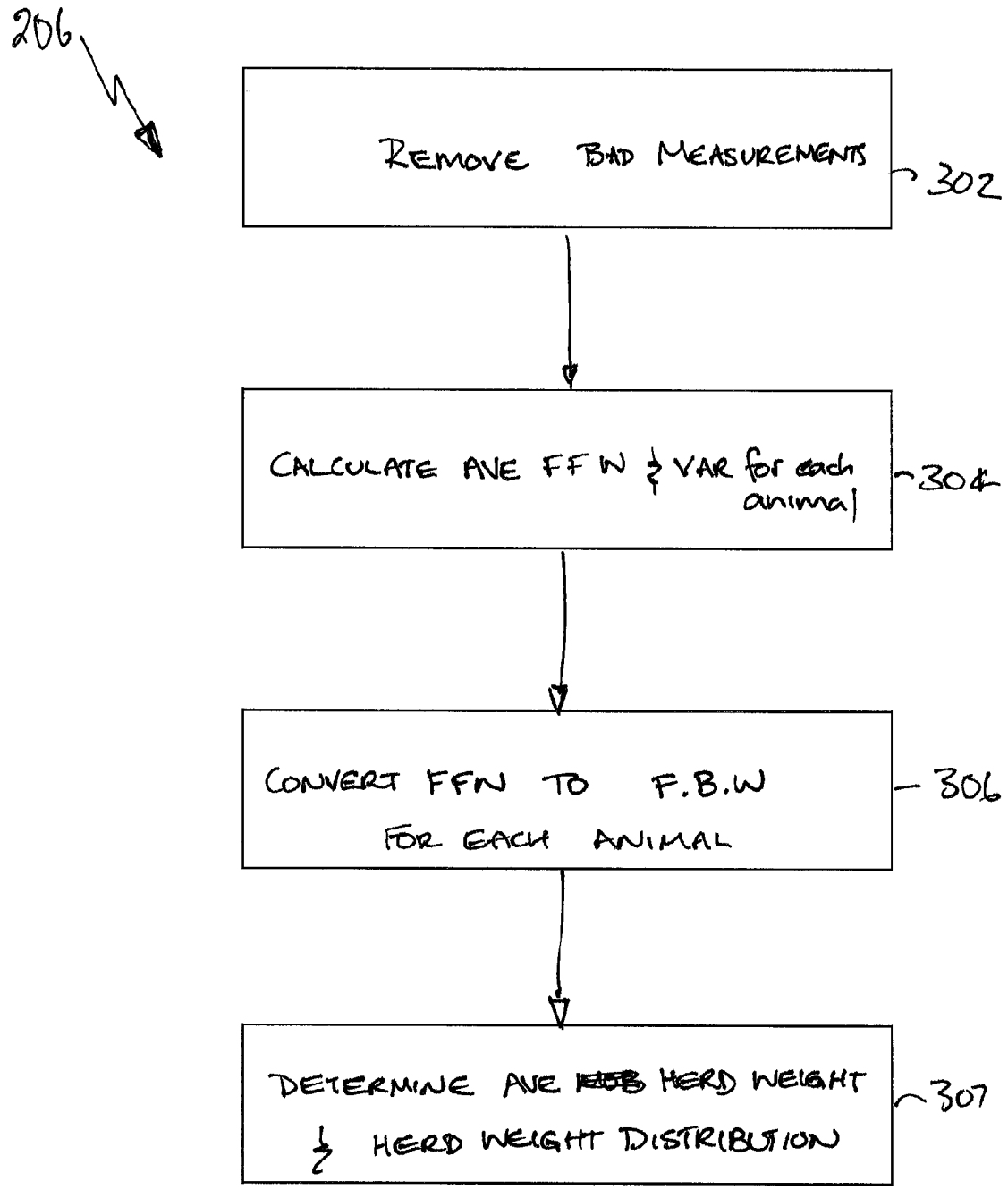
FIG. 5 is a method of processing the raw data into useful weight measurement data in accordance with an embodiment of the present invention.

The manner in which the data is processed in step 206 is shown in further detail in FIG. 5.

In step 302 the processor removes false measurements by reviewing the raw data and graphing the data and removing those measurements that fall outside acceptable limits. This may occur where an animal has only partially placed its weight on the weighbridge of the unit 10 or where another animal has also placed their weight in combination with the animal being detected by the reader of the device 10.

In step 304 the processor calculates an average front feet weight (FFW) and variance for each animal measured.

In step 306, the FFW is then converted to a full body weight (FBW) for each animal measured. This is achieved by multiplying the FFW by a conversion factor F to produce the FBW. In a simplified form, experimental data has shown that a good approximation for this conversion factor is 1.75, which has been sown to provide a good approximation of the FBW based on measured FFW. This calculation has been derived empirically as being the correlation between FFW and FBW based on data collected from in field trials. However, this conversion factor F may change according to animal breed, sex and/or weight class. Therefore, the conversion factor F may be obtained by a regression equation that includes adjustments according to animal breed, sex and/or weight class. In an embodiment of the invention, a variety of conversion factors (F) may be contained in a lookup table maintained by the host service which can be accessed for conversion of FFW into FBW for animals of a specific sex, weight class or breed, which may be detected from the animal's ID tag information.

Figure 6:
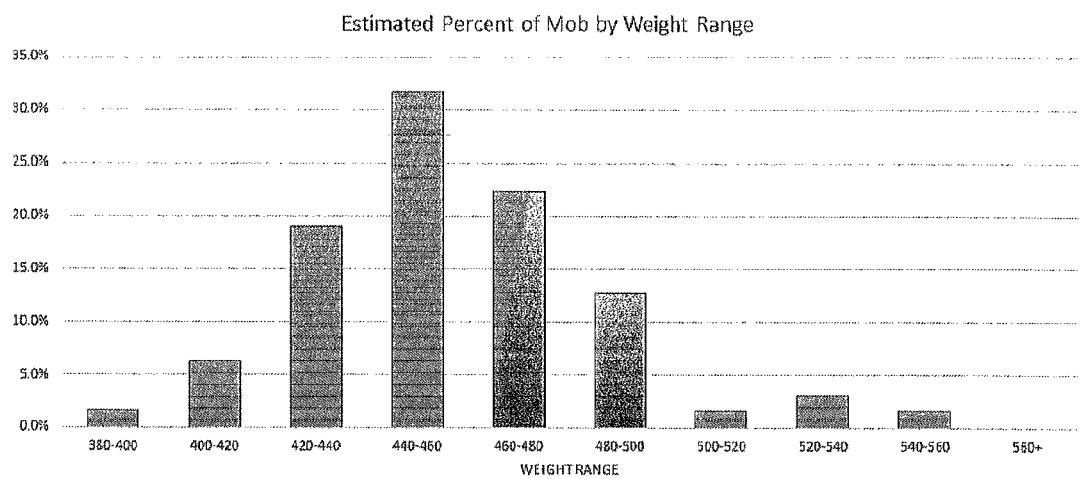
FIG. 6 is a table representing the average herd weight and herd weight distribution calculated based on the FBW converted data in accordance with an embodiment of the present invention.

In step 308, the average herd weight and herd weight distribution is calculated based on the FBW converted data to provide a graphed result, as shown in FIG. 6.

It will be appreciated that the livestock weight management system and method of the present invention provides for a simple and effective means for collecting weight measurement from the field in a natural manner as the animals graze. The data can then be collected as it is taken and processed either by way of a remote host for later consumption by the farmer or by the farmer through their own dedicated device. Such a system and method reduces the amount of time and manpower taken to perform this function and enables weight management to become a tool for all farmers to use, not just those farmers with access to dedicated and expensive weighing equipment.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A portable weighing unit for weighing animals in a grazing environment comprising:
   a body having a pair of side walls and an end wall that define a space for receiving an animal therein;
   a holder mounted to an internal surface of the end wall so as to be contained within the space, the holder configured to receive an enticement for attracting an animal into the space;
   a reader mounted with respect to the body, the reader being configured to read animal identification information provided on an identity tag of the animal within the space;
   a platform located within said space wherein the platform is configured to be supported by at least two load bars containing load cells to receive the front feet of the animal thereon when said animal enters said space and to take a weight measurement of the front feet of the animal; and
   a controller mounted to the body and configured to receive the weight measurement of the front feet of the animal from the platform and the animal identification information from the reader, said controller being configured to transmit said weight measurement and said animal identification information to a remote processor for processing;
   wherein the remote processor is configured to convert the weight measurement of the front feet of the animal into a full body weight measurement for the animal.

2. The portable weighing unit according to claim 1, wherein the body is configured to be transportable by a vehicle to a grazing environment for use.

3. The portable weighing unit according to claim 2, wherein the body has wheels to facilitate towing to said grazing environment for use.

4. The portable weighing unit according to claim 2, wherein the body is configured to be engaged by a lifting device of a vehicle to be carried by the vehicle to the grazing environment for use.

5. The portable weighing unit according to claim 1, wherein the pair of side walls comprise substantially open frame structures that extend substantially orthogonally from opposing ends of the end wall.

6. The portable weighing unit according to claim 1, wherein the holder comprises a box for receiving and displaying the enticement to the animal.

7. The portable weighing unit according to claim 6, wherein the enticement is a food or nutrient for consumption by the animal.

8. The portable weighing unit according to claim 7, wherein the enticement is a lick block for attracting the animal into the space and for maintaining the animal within the space for a period of time.

9. The portable weighing unit according to claim 1, wherein the reader is mounted within the space to read the animal identification information from the identity tag of the animal.

10. The portable weighing unit according to claim 9, wherein the reader is mounted on a side wall of the body to read the identity tag placed in an ear of the animal when the animal is within the space.

11. The portable weighing unit according to claim 9, wherein the reader is mounted within a box that is mounted within the space.

12. The portable weighing unit according to claim 11, wherein the reader is an RFID reader for reading an RFID tag of the animal.

13. The portable weighing unit according to claim 1, wherein the platform is fitted to substantially cover said space so as to receive the front feet of the animal present in the space.

14. The portable weighing unit according to claim 1, wherein the platform is raised above a ground surface to facilitate stepping of the animal onto the platform.

15. The portable weighing unit according to claim 1, wherein the controller comprises at least a microprocessor for receiving and storing the information from the reader and the platform and a transmitter for transmitting data to the remote processor.

16. The portable weighing unit according to claim 15, wherein the transmitter may be a wireless transmitter for transmitting data wirelessly to the remote processor.

17. The portable weighing unit according to claim 15, wherein the transmitter may include a USB connection for wired transmission of said data to the remote processor.

* * * * *